United States Patent
Htay

(10) Patent No.: US 10,050,991 B2
(45) Date of Patent: *Aug. 14, 2018

(54) SYSTEM AND METHOD FOR MONITORING NETWORK VULNERABILITIES

(71) Applicant: Aung Htay, Alpharetta, GA (US)

(72) Inventor: Aung Htay, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,849

(22) Filed: Oct. 19, 2017

(65) Prior Publication Data

US 2018/0041539 A1 Feb. 8, 2018

Related U.S. Application Data

(63) Continuation of application No. 15/143,455, filed on Apr. 29, 2016, now Pat. No. 9,825,982.

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01)

(58) Field of Classification Search
CPC ............................ H04L 63/1433; G06F 21/577
See application file for complete search history.

(56) References Cited

U.S. PATENT DOCUMENTS

| | | | |
|---|---|---|---|
| 7,735,141 B1 | 6/2010 | Noel et al. | |
| 2005/0005152 A1 | 1/2005 | Singh et al. | |
| 2008/0198856 A1 | 8/2008 | Vogel et al. | |
| 2011/0314143 A1 | 12/2011 | Vogel, III et al. | |
| 2012/0030750 A1 | 2/2012 | Bhargava et al. | |
| 2013/0047255 A1 | 2/2013 | Dalcher | |
| 2015/0163234 A1 | 6/2015 | Tal et al. | |
| 2015/0186645 A1 | 7/2015 | Aziz et al. | |
| 2015/0199531 A1* | 7/2015 | Ismael | G06F 21/552 726/30 |
| 2016/0232358 A1 | 8/2016 | Grieco et al. | |
| 2016/0241595 A1 | 8/2016 | Molloy et al. | |
| 2016/0323300 A1 | 11/2016 | Boss et al. | |
| 2017/0353498 A1* | 12/2017 | Huang | H04L 63/20 |
| 2018/0063083 A1* | 3/2018 | Tsirkin | H04L 63/0245 |

* cited by examiner

*Primary Examiner* — Michael Pyzocha
(74) *Attorney, Agent, or Firm* — Osha Liang LLP

(57) ABSTRACT

A method for managing network vulnerabilities may include obtaining image data regarding a software container located on a network element. The image data may describe a software image used to generate the software container. The method may further include determining, using the image data, a software vulnerability of the software image. The method may further include assigning the software vulnerability to a filesystem key. The method may further include generating, using the software vulnerability and the filesystem key, a vulnerability map of a network. The vulnerability map may describe various software vulnerabilities arranged according to various filesystem keys used on the network. The filesystem key may identify data of the software container within a filesystem on the network element.

20 Claims, 7 Drawing Sheets

Vulnerability Map 500

| Filesystem Keys 510 | Image Type 520 | Software Vulnerabilities 530 |
|---|---|---|
| 501 Filesystem Key A: (sha256:012a7829fd3ffd2155e75e721 ac5384131de4ee35e5b34330f5df9d4f 52935d5) | 511 Generic Open-Source Container 14.04 | CVE-2015-1420, CVE-2015-4001, CVE-2015-4002, CVE-2015-4003, CVE-2015-4700 |
| 502 Filesystem Key B: (sha256:41158247dd502205fcfc52011 54f587b957a75d32725e7b45185f22b5 2143e94) | 512 Generic Open-Source Container 8.01 | CVE-2013-1420, CVE-2013-4321, CVE-2013-5322, CVE-2013-4173, CVE-2013-2524 |
| 503 Filesystem Key C: (sha256:915b974d99af855381ea9e3c 929b4709058945bb44f3ad10dacfc5ea 3b2a935b) | 513 Generic Open-Source Container 5.07 | CVE-2012-1520, CVE-2012-0101, CVE-2012-3322, CVE-2012-4523, CVE-2012-5720 |
| 504 Filesystem Key D: (sha256:a3ed95caeb02ffe58cdd9fd84 405580ae93d533cb15422d00e8a7c22 955b45d4) | 511 Generic Open-Source Container 14.04 | CVE-2015-1420, CVE-2015-4001, CVE-2015-4002, CVE-2015-4003, CVE-2015-4700 |

FIG. 5

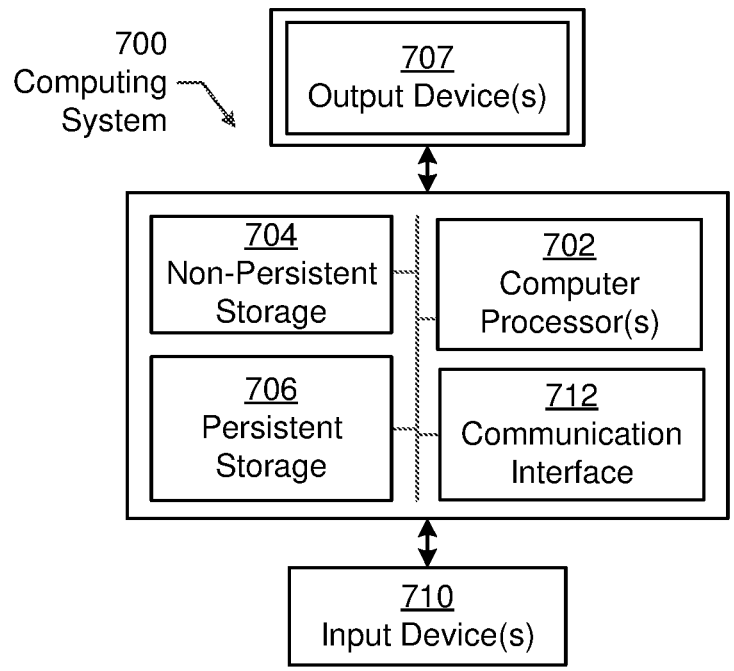
*FIG. 7.1*
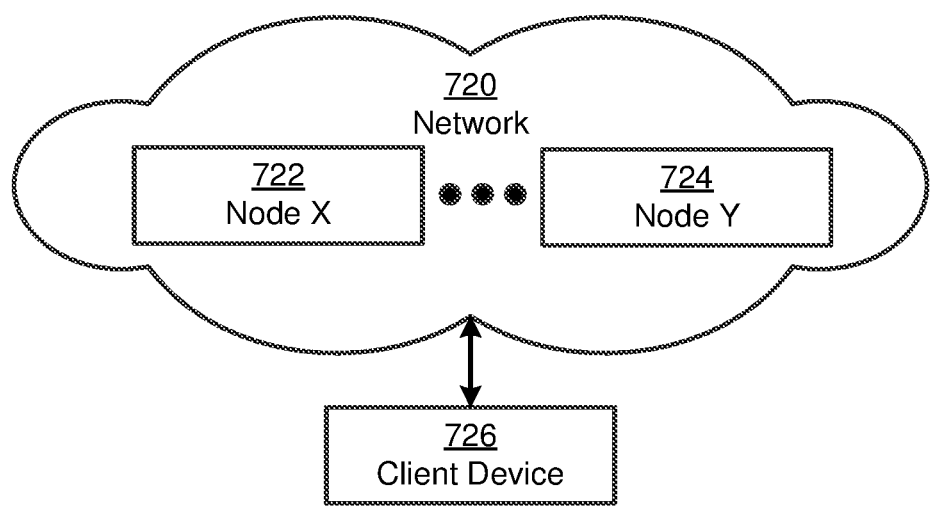
*FIG. 7.2*

SYSTEM AND METHOD FOR MONITORING NETWORK VULNERABILITIES

CROSS REFERENCE TO RELATED APPLICATIONS

This application is a continuation of and claims benefit under 35 U.S.C. § 120 to U.S. application Ser. No. 15/143,455, filed Apr. 29, 2016, which is incorporated herein by reference in its entirety.

BACKGROUND

Various software applications may be installed and operated on various network elements within a network. These software applications may be visible across the network or hidden within a virtual machine operating on a network element. Accordingly, vulnerabilities exists with these software applications that may not be apparent from various entities that manage the network.

SUMMARY

In general, in one aspect, the invention relates to a method for managing network vulnerabilities. The method includes obtaining image data regarding a software container located on a network element. The image data describes a software image used to generate the software container. The method further includes determining, using the image data, a software vulnerability of the software image. The method further includes assigning the software vulnerability to a filesystem key. The method further includes generating, using the software vulnerability and the filesystem key, a vulnerability map of a network. The vulnerability map describes various software vulnerabilities arranged according to various filesystem keys used on the network. The filesystem key identifies data of the software container within a filesystem on the network element.

In general, in one aspect, the invention relates to a system for managing network vulnerabilities. The system includes various network elements that include a first network element and a second network element. The system further includes a network controller that obtains image data regarding a software container located on a network element. The image data describes a software image used to generate the software container. The network controller determines, using the image data, a software vulnerability of the software image. The network controller assigns the software vulnerability to a filesystem key. The network controller generates, using the software vulnerability and the filesystem key, a vulnerability map of the network elements. The vulnerability map describes various software vulnerabilities arranged according to various filesystem keys used among the network elements. The filesystem key identifies data of the software container within a filesystem on the first network element.

In general, in one aspect, the invention relates to a non-transitory computer readable medium (CRM) storing a plurality of instructions for managing network vulnerabilities. The instructions include functionality for obtaining image data regarding a software container located on a network element. The image data describes a software image used to generate the software container. assigning the software vulnerability to a filesystem key determining, using the image data, a software vulnerability of the software image. The instructions further include functionality for assigning the software vulnerability to a filesystem key. The instructions further include functionality for generating, using the software vulnerability and the filesystem key, a vulnerability map of a network. The vulnerability map describes various software vulnerabilities arranged according to various filesystem keys used on the network. The filesystem key identifies data of the software container within a filesystem on the network element.

Other aspects of the invention will be apparent from the following description and the appended claims.

BRIEF DESCRIPTION OF DRAWINGS

FIG. 5 shows an example in accordance with one or more embodiments.

FIGS. 7.1 and 7.2 show a computing system in accordance with one or more embodiments.

DETAILED DESCRIPTION

Figure 1:
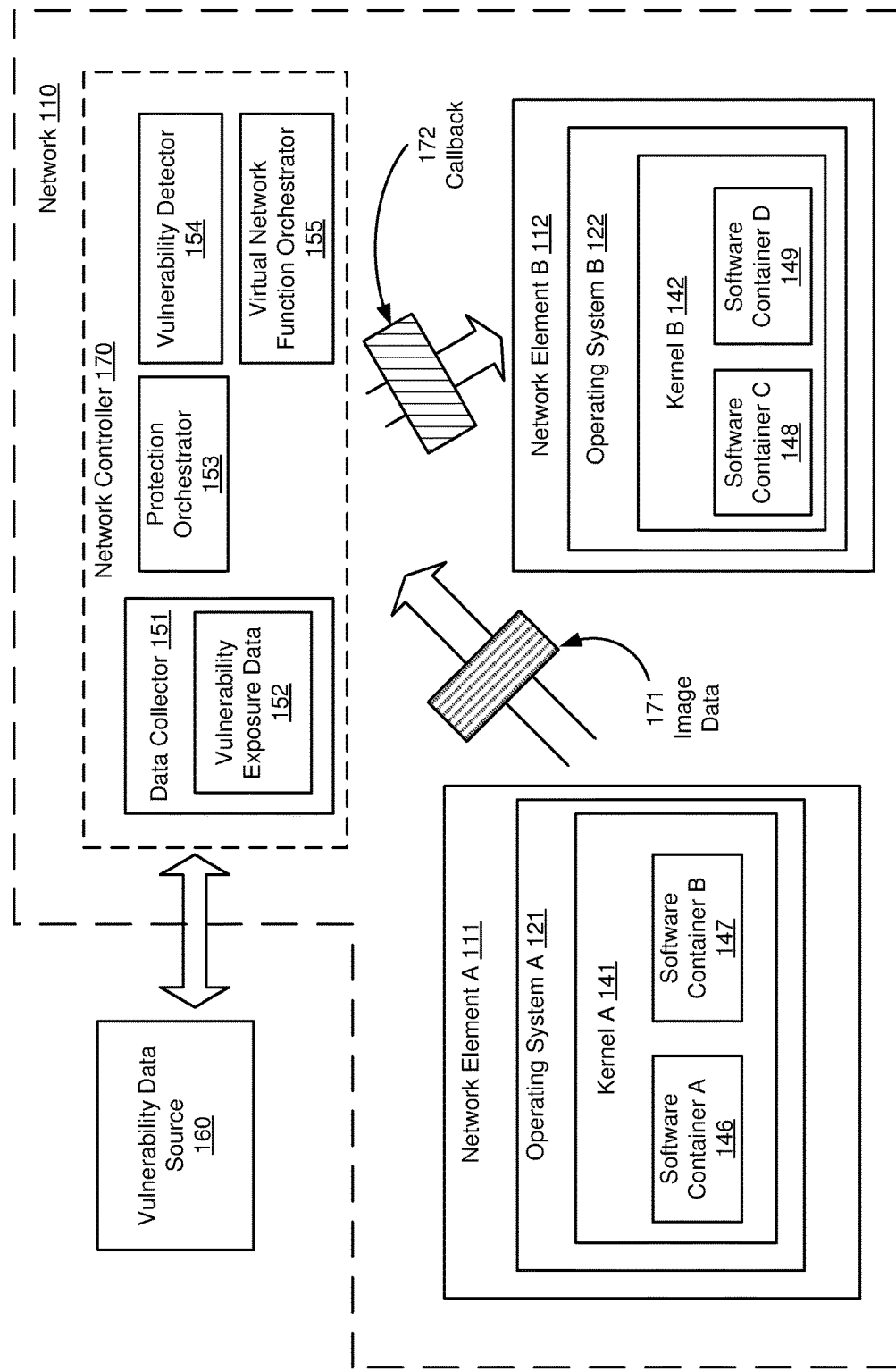
FIGS. 1 and 2 show systems in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include a system and various methods for managing network vulnerabilities. In particular, one or more embodiments are directed to a method that includes obtaining image data regarding a software container operating on a network element. The image data may correspond to a unique filesystem key associated with a type of software image used to generate the software container. In one or more embodiments, for example, the filesystem key identifies data of a software container in a layer of a filesystem on the network element. Thus, other filesystem keys may identify data for other software programs within the filesystem. Furthermore, a network controller may identify the types of software images for software containers used throughout a network based on which network elements also use a particular filesystem key. Moreover, by knowing which software images provide the basis for software containers on the network, the network controller may identify software vulnerabilities on and/or between particular network elements.

FIG. 1 shows a block diagram of a system in accordance with one or more embodiments. As shown in FIG. 1, a network (110) may include various network elements (i.e., network element A (111), network element B (112)) that may be operably connected to a network controller (170). The network elements (111, 112) may be computing systems similar to the computing system (700) described in FIGS. 7.1 and 7.2, and the accompanying description. The network controller (170) may be software and/or hardware implemented on the network (110). In one or more embodiments, the network controller (170) is a software defined network (SDN) controller. For example, an SDN controller may be implemented using hardware and/or software distributed across multiple platforms, e.g., the network elements (111, 112) as well as other network elements not shown in FIG. 1.

Software operating on the network elements (111, 112) may include various operating systems (e.g., operating system A (121), operating system B (122)). In particular, an operating system may be system software that manages hardware and/or software resources on a computing system, such as one of the network elements (111, 112). For example, an operating system may include functionality to allocate resources among various software applications operating on a respective network element.

Moreover, the operating systems (121, 122) may implement control over network resources on the network elements (111, 112) using kernels (e.g., kernel A (141), kernel B (142)). Specifically, a kernel may be system software that includes functionality to manage input and/or output requests from software applications operating on a network element. Specifically, a kernel may translate software instructions into data processing instructions for a processor and/or other electrical components on a respective network element. For example, a kernel may allocate memory between different software processes performed by various software applications operating on a network element.

In one or more embodiments, various software containers (e.g., software container A (146), software container B (147), software container C (148), software container D (149)) operate on the network elements (111, 112). In particular, a software container may be a running instance of a particular software image. For example, the software image may relate to underlying source code of the software container, while the software container may be a dynamically-changing software program implemented on a computing system as a result of executing the software image. In other words, a software image may be software code that defines classes and/or the framework for implementing the software container on the kernel. Thus, a software container may be a user-space instance implemented by a single kernel (e.g., kernel A (141) or kernel B (142)) of one of the operating systems (121, 122). Moreover, the software container may include functionality to present a virtualized server to a user through an operating-system level virtualization. For example, kernel A (141) on operating system A (121) may operate multiple software containers, such as software container A (146) and software container B (147).

Moreover, a software container may include functionality to provide a server-virtualization on a network element. In other words, a software container may provide server functionality from the perspective of a user, while the kernel implementing the software container may mask network element resources regarding the software container from another software container implemented by the kernel. Furthermore, software containers may refer to application containers, operating system containers, and various other types of containers. In one or more embodiments, for example, one or more of the software containers (146, 147, 148, 149) are open-sourced containers, such as docker containers.

Figure 2:
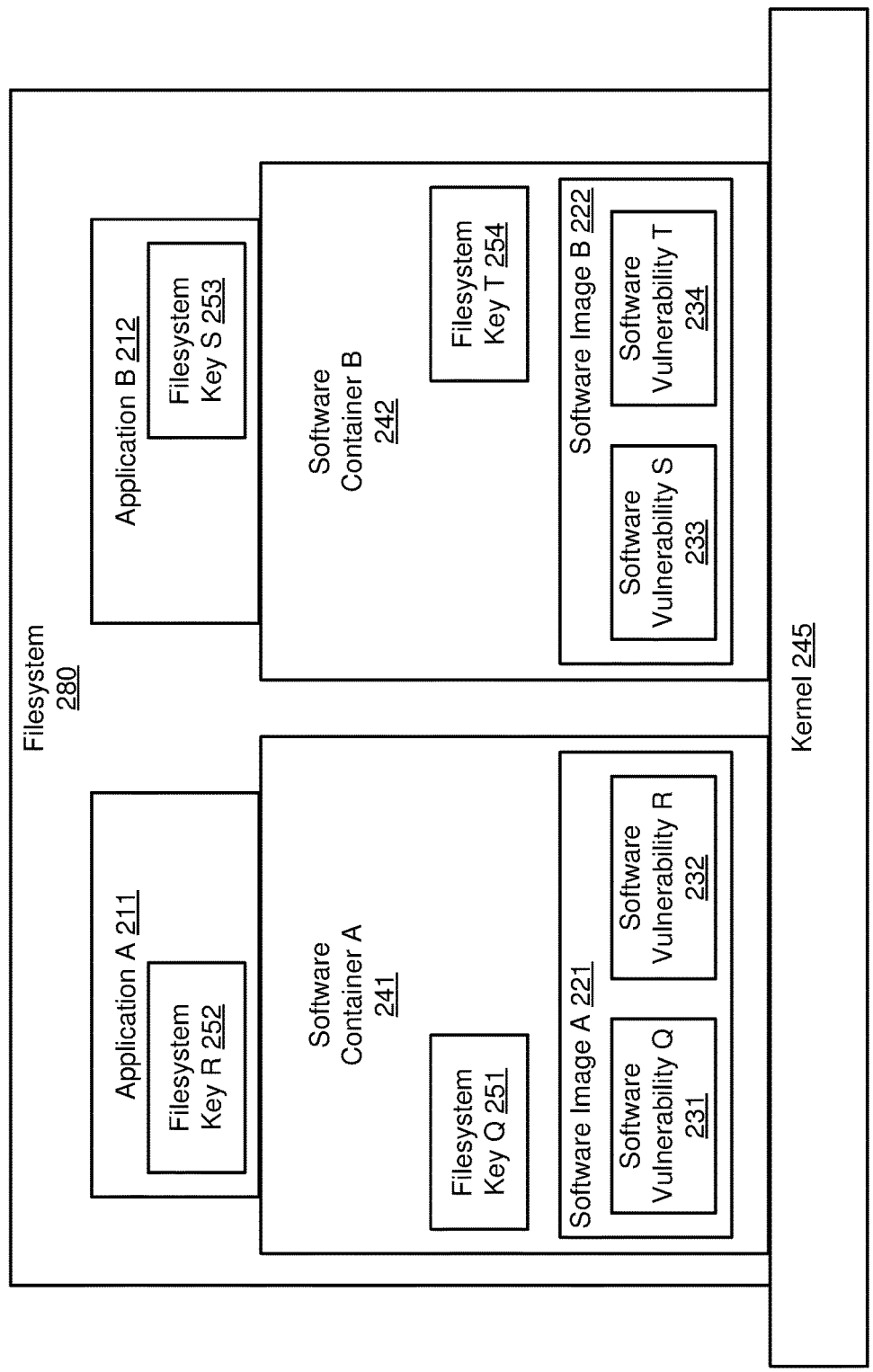

Turning to FIG. 2, FIG. 2 shows a block diagram of a system in accordance with one or more embodiments. As shown in FIG. 2, a filesystem (280) is implemented using various filesystem keys (e.g., filesystem key Q (251), filesystem key R (252), filesystem key S (253), filesystem key T (254)). In one or more embodiments, the filesystem (280) is divided into various filesystem layers that overlays data between different filesystem layers of a computing system. For example, various software applications (e.g., application A (211), application B (212)) may operate on kernel (245) and be masked from each other using different filesystem layers corresponding to filesystem key R (252) and filesystem key S (253), respectively. In one or more embodiments, for example, a filesystem key identifies data belonging to a particular filesystem layer.

Furthermore, the filesystem keys (251, 252, 253, 254) may be a data string, checksum, or other type of data value. For example, a filesystem key may be a specific string value that includes functionality for implementing a security protocol and/or a cryptographic algorithm. Likewise, a filesystem key may represent a certificate for implementing a security protocol, such as transport layer security (TLS) or a secure socket layer (SSL) with a cryptographic hash function. In one or more embodiments, for example, the filesystem keys (251, 252, 253, 254) are secure hash algorithm (SHA) keys.

Keeping with FIG. 2, the software containers (e.g., software container A (241), software container B (242)) may have various software vulnerabilities (e.g., software vulnerability Q (231), software vulnerability R (232), software vulnerability S (233), software vulnerability T (234)) based on the underlying software code of the software images (e.g., software image A (221), software image B (222)). A software vulnerability may be a system operability and/or security issue generated in an implementation of a software program. For example, a system operability issue may be an underlying software and/or hardware issue that causes a software application to crash. A security issue may include, for example, an exposure with software code that may be exploited by an entity outside the owner of a network. Moreover, software vulnerability Q (231) and software vulnerability R (232) may relate to the version and type of the software image A (221). Thus, a later version of software image A (221) may have different and/or new software vulnerabilities in comparison to the software vulnerabilities existing with an earlier version of software image A (221). On the other hand, software vulnerability Q (231) and software vulnerability R (232) may be eliminated in a software container operating with a later version of the software image A (221).

In one or more embodiments, a filesystem key provides a unique identifier that designates a particular type of software image. In one or more embodiments, for example, the value of filesystem key Q (251) is the same value for each software container generated from the same type and version of software image A (221). Moreover, the type and/or version of a software image that forms the basis of a software container may be identified over a network from a particular filesystem key obtained from a particular network element.

Returning to FIG. 1, in one or more embodiments, the network elements (111, 112) include functionality to transmit image data (171) over a network (110) to a network controller (170). The image data (171) may include information that describes a particular software image, such as the type and/or version of the software image. For example, the image data (171) may describe software image A (221) and/or software image B (222) from FIG. 2. In one or more embodiments, the image data (171) describes various filesystem keys implemented in a filesystem on one of the network elements (111, 112). In another example, the image data (171) may be a filesystem manifest that describes various filesystem layers on the network element A (111). Moreover, the image data (171) may include functionality that causes the network controller (170) to identify one or more software containers (e.g., software container A (146), software container B (147)) operating on the network element A (111).

In one or more embodiments, the network controller (170) includes functionality to transmit a callback (172) to a network element to obtain image data (171). The callback (172) may be a message and/or an executable portion of code that includes functionality to cause the network element B (112) to transmit image data back to the network controller (170). In one or more embodiments, for example, a callback is a webhook. In particular, a webhook may include software code that causes the network element B (112) to execute specific software code.

Keeping with FIG. 1, in one or more embodiments, the network controller (170) includes a data collector (151) that includes functionality to store vulnerability exposure data (152). Vulnerability exposure data (152) may be information that describes various software vulnerabilities of FIG. 2 (e.g., software vulnerability Q (231), software vulnerability R (232)) located on network elements in a network. In one or more embodiments, for example, the vulnerability exposure data (152) is common vulnerability and exposure (CVE) data. In one or more embodiments, for example, the data collector (151) may include functionality to obtain vulnerability exposure data (152) from the image data (171).

In one or more embodiments, the data collector (151) includes functionality to obtain the vulnerability exposure data (152) from a vulnerability data source (160). In one or more embodiments, for example, the vulnerability data source (160) is a server located outside the network (110). Likewise, the vulnerability data source (160) may be a publicly-available database located on the Internet that is operably connected to the network controller (170).

In one or more embodiments, the network controller (170) includes a vulnerability detector (154). The vulnerability detector (154) may be hardware and/or software that includes functionality to analyze the network (110) and determine the type and/or location of software vulnerabilities throughout the network (110). In one or more embodiments, for example, the vulnerability detector (154) includes functionality to identify one or more threats to the network (110) using the vulnerability exposure data (152). Threats may include, for example, security threats, network issues that affect communication across the network (110), and/or any other specific threats that may affect the performance of the network (110) and/or specific network elements (111, 112).

In one or more embodiments, the network controller (170) includes a protection orchestrator (153). The protection orchestrator (153) may include hardware and/or software that includes functionality to transmit threat information regarding one or more threats determined by the vulnerability detector (154). In particular, the protection orchestrator (153) may include functionality to send threat information outside the network (110) to an external entity. In one or more embodiments, for example, the protection orchestrator (153) includes functionality to generate a notification regarding which threats exist on the network (110) and/or one or more network elements (111, 112). The notification may be, for example, a message to an entity outside the network (110) regarding the one or more threats.

In one or more embodiments, the network controller (170) includes a virtual network function (VNF) orchestrator (155). The VNF orchestrator (155) may include hardware and/or software that includes functionality to manage acquiring the image data (171) over the network (110). In one or more embodiments, for example, the VNF orchestrator (155) inserts a vRegistry into a service chain within the network (110). The service chain may correspond to multiple virtual network functions in a sequence that deliver a network service. Network functions may include routing protocols, firewalls, wide area network (WAN) optimizations, where a virtual network function may be a virtualization of such network functions. Accordingly, virtual network functions may be deployed in a virtualized infrastructure on the network (110). For example, the service chain may include the sequence of functions performed on a data stream over the network (110).

In one or more embodiments, the network (110) includes a virtual WAN (vWAN) optimizer VNF that optimizes the bandwidth between a particular enterprise and a container service. Users within the enterprise may pull software images from the container service. Thus, bandwidth over the network (110) may be congested. The VNF orchestrator (155) may include functionality to determine which software images are being pulled from the container service. In one or more embodiments, when the VNF orchestrator (155) determines that one or more of the software images are cached locally, the VNF orchestrator (155) inserts a vRegistry in front of the vWAN so that the software images may be supplied to the users without incurring network traffic to the container service. As such, a vRegistry may be a VNF implementation of the container registry.

While FIG. 1 shows various configurations of components, other configurations may be used without departing from the scope of the invention. For example, various components may be combined to create a single component. As another example, the functionality performed by a single component may be performed by two or more components.

Figure 3:
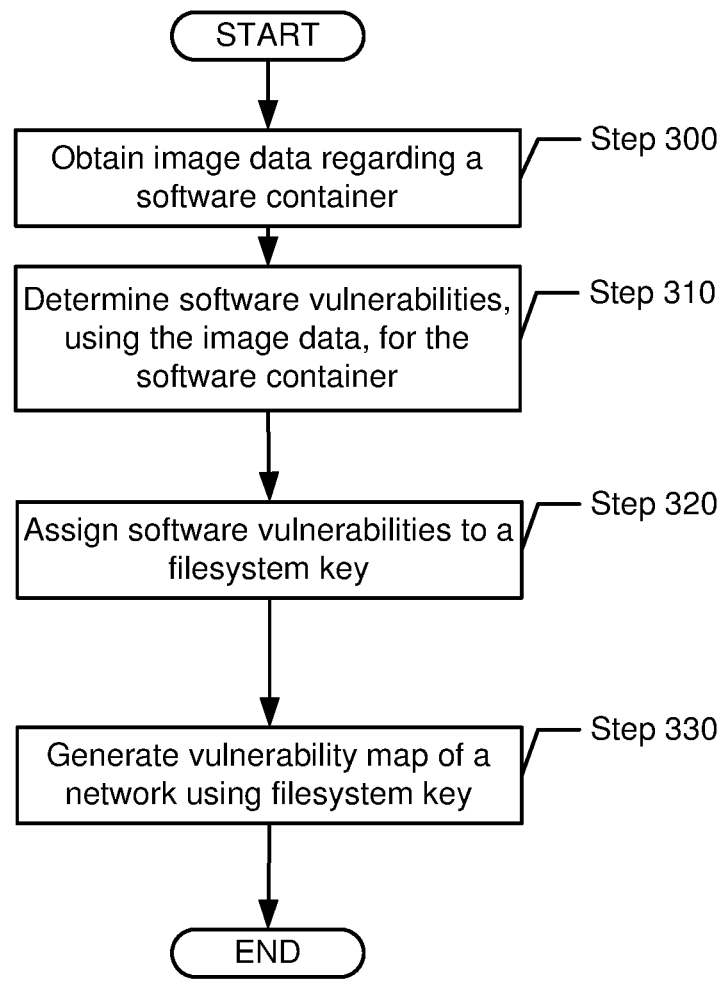
FIGS. 3 and 4 show flowcharts in accordance with one or more embodiments.

FIG. 3 shows a flowchart in accordance with one or more embodiments. Specifically, FIG. 3 describes a method for generating a vulnerability map. One or more steps in FIG. 3 may be performed by one or more components (e.g., network controller (170)) as described in FIG. 1. While the various steps in FIG. 3 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, image data is obtained regarding a software container in accordance with one or more embodiments. For example, the image data may be obtained from one or more network elements located on a network. In one or more embodiments, a network element may transmit a filesystem manifest that includes image data to a network controller on the network. For example, the filesystem manifest may identify various filesystem layers on a network element and the respective filesystem keys for each of the filesystem layers. The filesystem manifest may be transmitted in response to a request from a network controller. On the other hand, a network element may automatically send the filesystem manifest to the network controller at specific times.

For example, the manifest may be transmitted automatically whenever a new software container is generated on the network element.

In Step 310, various software vulnerabilities are determined for a software container using the image data in accordance with one or more embodiments. Using the image data obtained in Step 300, for example, a network controller may identify a software image that is the basis for one or more software containers operating on a network element. For example, the network controller may parse the image data to determine a type and/or version of the software image that forms the basis for one or more software containers. A network controller may determine software vulnerabilities associated with the software image using available vulnerability exposure data. For example, the network controller may access a vulnerability data source located locally on the network, e.g., in a data repository, and/or from a server outside the network, e.g., over the Internet.

In Step 320, various software vulnerabilities are assigned to a filesystem key in accordance with one or more embodiments. In one or more embodiments, the filesystem key may provide a unique identifier for identifying a software image throughout a network. For example, a specific type of software container operating on various network elements may be layered on the network elements with the same filesystem key. Accordingly, in one or more embodiments, a filesystem key provides an identifier of the underlying software image. As such, a network controller may use the identifier to monitor which network elements use the software image throughout the network. Moreover, software vulnerabilities associated with the underlying software image may be assigned to the filesystem key. Thus, a filesystem key may represent various software vulnerabilities associated with a network element.

In Step 330, a vulnerability map of a network is generated using a filesystem key in accordance with one or more embodiments. In one or more embodiments, for example, the vulnerability map is a table illustrating various filesystem keys used on network elements throughout a network. Accordingly, when a network controller desires to determine whether a threat exists for any network elements based on one or more software vulnerabilities, the network control may use the vulnerability map. Thus, software vulnerabilities may be identified at particular network elements that have the corresponding filesystem key. In one or more embodiments, the vulnerability map lists which network elements use a corresponding filesystem key. For an example of a vulnerability map, see FIG. 5 and the accompanying description below.

Figure 4:
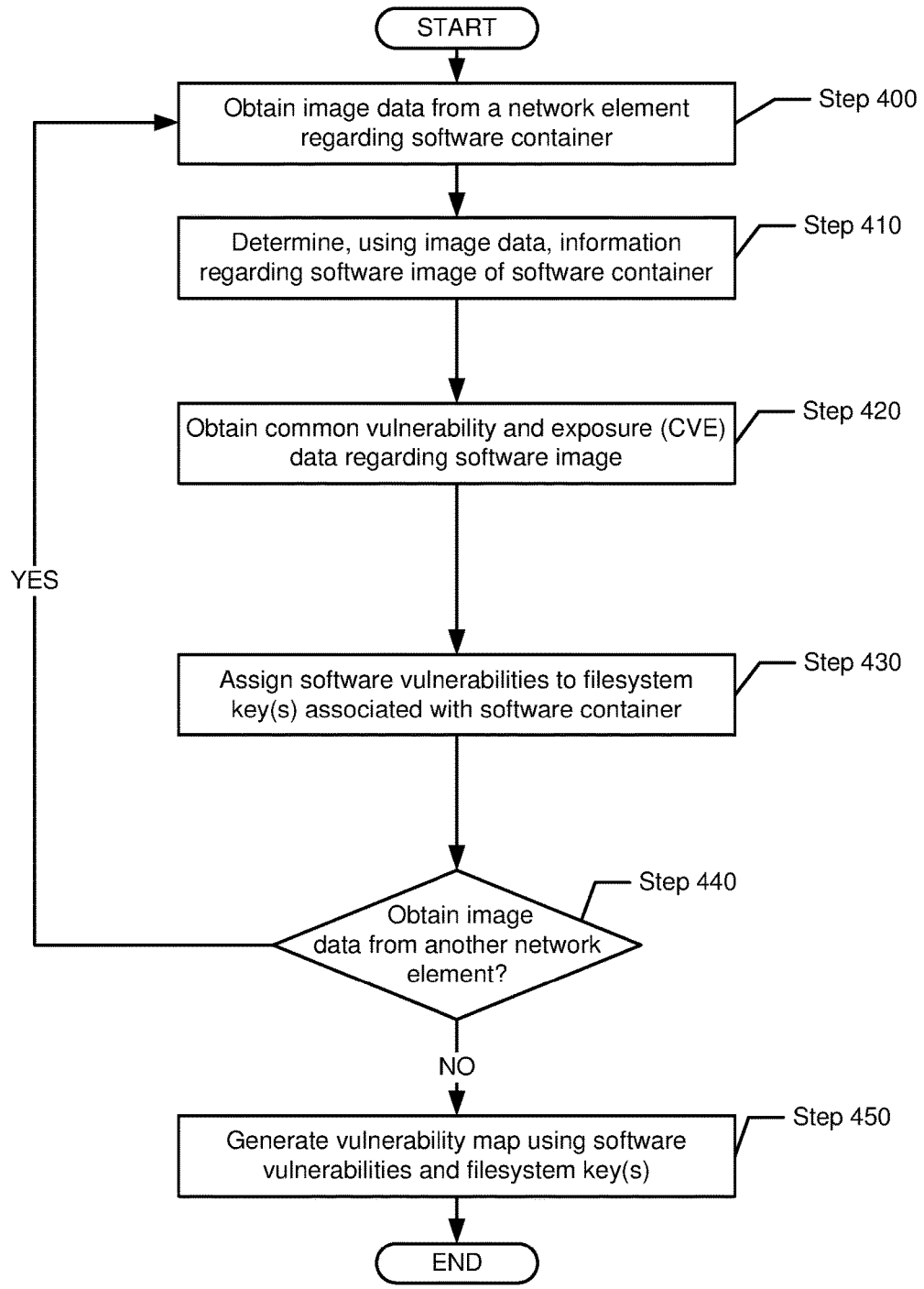

FIG. 4 shows a flowchart for generating a vulnerability map in accordance with one or more embodiments. Specifically, FIG. 4 describes a specific method for generating a vulnerability map. One or more steps in FIG. 4 may be performed by one or more components (e.g., a network controller (170)) as described in FIG. 1. While the various steps in FIG. 4 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, image data is obtained regarding a software container in accordance with one or more embodiments. For example, a network controller may use a callback to obtain image data from a particular network element in a network. The network controller may gather image data to determine which filesystem keys are located on which network elements as well as to determine the software images of software containers located on the network elements. In one or more embodiments, a software application is operating in the software container. As such, the software application may determine which filesystem keys are being used on the network elements as well as any other image data regarding the software container and/or any other software applications. Accordingly, the software application may transmit the image data to a network controller.

In Step 410, information regarding a software image of a software container is determined using image data in accordance with one or more embodiments. In one or more embodiments, for example, a network controller may identify various types of information associated with a software image of the software container from Step 400. For example, the information may describe the date and/or version number of the software image used to produce the software container. Moreover, the information may identify whether the software image is publicly-available software, e.g., an open-source software application or a proprietary program. The information may be extracted from the image data obtained in Step 400. On the other hand, once the software image is identified, a network controller may obtain information regarding the software image outside the network, e.g., over the Internet.

In Step 420, common vulnerability exposure data is obtained regarding a software image in accordance with one or more embodiments. For example, a network controller may access a public database available over the Internet that provides and updates CVE data for various software programs, such as software containers. For example, the CVE data may be located at a vulnerability data source.

In Step 430, various software vulnerabilities are assigned to one or more filesystem keys in accordance with one or more embodiments. For example, the CVE data from Step 420 may identify a particular software vulnerability. Accordingly, a network controller may assign that software vulnerability to each filesystem key associated with a particular software image. In one or more embodiments, a network controller aggregates various filesystem keys into a database with corresponding software vulnerabilities for the filesystem keys. When new software vulnerabilities become known for a particular software image, the network controller may update the software vulnerabilities for the respective filesystem key accordingly. Thus, the network controller may be able to monitor the number and/or type of software vulnerabilities throughout a network which are associated with software containers.

In Step 440, a determination is made whether to obtain image data from another network element in accordance with one or more embodiments. In one or more embodiments, for example, a VNF orchestrator may determine whether image data has been collected from each network element in the network. In one or more embodiments, the determination is made indirectly using the service chain of actions performed on the network. When a determination is made that image data is desired from another network element, the process may proceed to Step 400. When a determination is made that image data has been obtained for all software containers operating on the network, the process may proceed to Step 450.

In Step 450, a vulnerability map is generated using one or more software vulnerabilities and one or more filesystem keys in accordance with one or more embodiments.

Turning to FIG. 5, FIG. 5 provides an example of a vulnerability map. The following example is for explanatory purposes only and not intended to limit the scope of the invention.

Turning to FIG. 5, a vulnerability map (500) is shown as a table with various cells organized by various index fields (e.g., filesystem keys (510), image type (520), software vulnerabilities (530)). In particular, the index for the filesystem keys (510) illustrates various filesystem keys (e.g., filesystem key A (501), filesystem key B (502), filesystem key C (503), and filesystem key D (504)) associated with respective overlaid layers used throughout a network. Thus, each filesystem key in the vulnerability map (500) may correspond to a unique fixed size 256-bit secured hash algorithm (sha) hash value. Moreover, column of the filesystem keys (510) matches to a particular image type (520) of a software container. For example, filesystem key A (501) and filesystem key D (504) match to the generic open-source container 14.04 (511). Filesystem key B (502) matches to generic open-source container 8.01 (512). Filesystem key C (503) matches to generic open-source container 5.07 (513). Thus, multiple filesystem keys may correspond to a single image type. In one or more embodiments, a vulnerability map also includes which network elements use a particular filesystem key.

Keeping with FIG. 5, the vulnerability map (500) describes software vulnerabilities (530) associated with the filesystem keys (510). Specifically, CVE definitions are listed for each of the filesystem keys (510). The software vulnerabilities (530) may be obtained by a vulnerability detector in a network identifying the CVE identification number associated with a particular image type. Accordingly, a network controller on a network may identify which network elements may have the software vulnerabilities (530) based on which filesystem key is associated with the software containers and/or other software applications operating on a particular network element.

Figure 6:
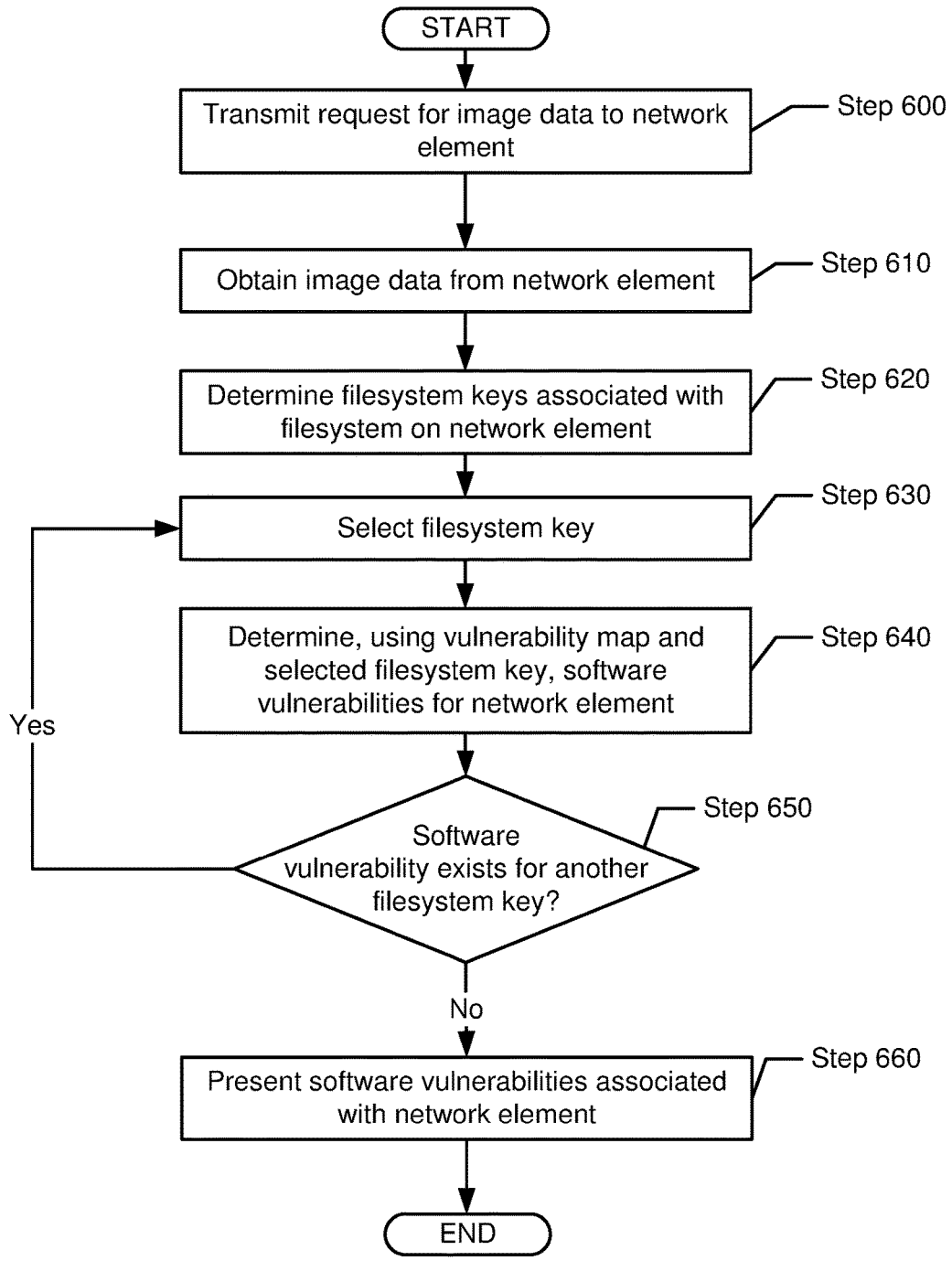
FIG. 6 shows a flowchart in accordance with one or more embodiments.

Turning to FIG. 6, FIG. 6 shows a flowchart in accordance with one or more embodiments. Specifically, FIG. 6 describes a method for using a vulnerability map to diagnose and/or remedy threats to a network based on various software vulnerabilities in software containers. One or more steps in FIG. 6 may be performed by one or more components (e.g., a network controller (170)) as described in FIG. 1. While the various steps in FIG. 6 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 600, a request for image data is transmitted to a network element in accordance with one or more embodiments. In one or more embodiments, for example, a network controller sends callbacks to one or more network elements in a network. The callback may include executable code that causes a network element to send image data, such as in an filesystem manifest, back to the network controller.

In Step 610, image data is obtained from a network element in accordance with one or more embodiments. For example, in response to a callback sent to various network elements in Step 600, a data collector in a network may gather image data from the network elements. Thus, the image data may be aggregated in a data repository and/or a network cache on the network.

In Step 620, various filesystem keys are determined that are associated with a filesystem on a network element in accordance with one or more embodiments. Using the image data from Step 610, a vulnerability detector in a network may identify which filesystem keys are being used on a particular network element.

In Step 630, a filesystem key (also called "the selected filesystem key") is selected in accordance with one or more embodiments. Specifically, a network controller may iteratively analyze the filesystem keys determined in Step 620 to determine respective software vulnerabilities associated with the selected filesystem key. On the other hand, if the network is being analyzed for which network elements have software based on a particular software image, a network controller may determine which filesystem key corresponds to the software image and select that filesystem key accordingly.

In Step 640, various software vulnerabilities are determined for a network element using a vulnerability map and a selected filesystem key in accordance with one or more embodiments. For example, a network controller may use a vulnerability map generated above in Step 450 of FIG. 4. Thus, a network controller may perform a lookup using the vulnerability map regarding which software vulnerabilities exist with the network element.

In one or more embodiments, software vulnerabilities are determined for endpoints in an end-to-end connection. A network controller may analyze the filesystem keys located at the endpoints and/or any intervening nodes and/or cross-connections that form the end-to-end connection between the end points.

In Step 650, a determination is made whether one or more software vulnerabilities exist for another filesystem key in accordance with one or more embodiments. When a determination is made that one or more filesystem keys remain to be analyzed for software vulnerabilities, the process may proceed to Step 630. When a determination is made that each filesystem key has been analyzed, the process may proceed to Step 660.

In Step 660, one or more software vulnerabilities associated with a network element are presented in accordance with one or more embodiments. For example, a protection orchestrator may transmit a notification to a particular network element and/or an entity outside a network. The notification may describe various threats based on the software vulnerabilities associated as well as possible solutions for addressing the threats. The notification may be an email and/or other message between computing systems. Likewise, the notification may be presented in a graphical user interface.

Embodiments may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (707), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the invention.

The computing system or group of computing systems described in FIGS. 7.1 and 7.2 may include functionality to perform a variety of operations disclosed herein. For example, the computing system(s) may perform communication between processes on the same or different systems.

A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention.

The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (700) in FIG. 7.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7.1, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7.1 and the nodes and/or client device in FIG. 7.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing network vulnerabilities, comprising:
   determining, using a computer processor, a filesystem key associated with a first hardware network element in a network,
      wherein the filesystem key corresponds to a software container among a plurality of software containers, and
      wherein the plurality of software containers are virtualized user-space instances operating on a single kernel in the first hardware network element;
   determining a first software vulnerability of a first software image using the computer processor, the filesystem key, and a vulnerability map of the network,
      wherein the vulnerability map describes a plurality of software vulnerabilities arranged according to a plurality of filesystem keys that are used on the network, and
      wherein the first software image is used to generate the software container; and
   presenting, using a graphical user interface and the computer processor, the first software vulnerability to a user.

2. The method of claim 1, wherein the first software vulnerability is determined by a network controller using the vulnerability map.

3. The method of claim 1, further comprising:
   identifying a security issue associated with the first software vulnerability,
      wherein the security issue comprises an exposure of software code operating on the network element to an entity outside the network.

4. The method of claim 1, further comprising:
   identifying a hardware issue associated with the first software vulnerability that causes a software application crash on the first hardware network element.

5. The method of claim 1, further comprising:
   transmitting, to a computer system located outside the network, a notification regarding the first software vulnerability on the first hardware network element,
      wherein the notification identifies a solution to the first software vulnerability.

6. The method of claim 1, further comprising:
   obtaining, from a vulnerability data source, vulnerability information regarding a second software image,
      wherein the vulnerability information describes a second software vulnerability, and
   identify, using the vulnerability map, a second hardware network element that has the second software vulnerability.

7. The method of claim 1, wherein determining the first software vulnerability comprises:
   determining a version of the first software image; and
   obtaining, from a software vulnerability data source, common vulnerability and exposure (CVE) data based on the version of the software image.

8. The method of claim 1, wherein the filesystem key is a secured hash algorithm key for a secured layer of the filesystem comprising a plurality of secured layers.

9. A non-transitory computer readable medium storing instructions managing network vulnerabilities, the instructions comprising functionality for:
   determining a filesystem key associated with a first hardware network element in the network,
      wherein the filesystem key corresponds to a software container among a plurality of software containers, and
      wherein the plurality of software containers are virtualized user-space instances operating on a single kernel in the first hardware network element;
   determining, using the filesystem key and a vulnerability map of the network, a first software vulnerability of a first software image,
      wherein the vulnerability map describes a plurality of software vulnerabilities arranged according to a plurality of filesystem keys that are used on the network, and
      wherein the first software image is used to generate the software container; and
   presenting, using a graphical user interface, the first software vulnerability to a user.

10. The non-transitory computer readable medium of claim 9, the instructions further comprising functionality for:
   identifying a security issue associated with the first software vulnerability,
      wherein the security issue comprises an exposure of software code operating on the network element to an entity outside the network.

11. The non-transitory computer readable medium of claim 9, the instructions further comprising functionality for:
    identifying a hardware issue associated with the first software vulnerability that causes a software application crash on the first hardware network element.

12. The non-transitory computer readable medium of claim 9, the instructions further comprising functionality for:
    transmitting, to a computer system located outside the network, a notification regarding the first software vulnerability on the first hardware network element, wherein the notification identifies a solution to the first software vulnerability.

13. The non-transitory computer readable medium of claim 9, the instructions further comprising functionality for:
    obtaining, from a vulnerability data source, vulnerability information regarding a second software image, wherein the vulnerability information describes a second software vulnerability, and
    identify, using the vulnerability map, a second hardware network element that has the second software vulnerability.

14. The non-transitory computer readable medium of claim 9, wherein determining the first software vulnerability comprises:
    determining a version of the first software image; and
    obtaining, from a software vulnerability data source, common vulnerability and exposure (CVE) data based on the version of the software image.

15. The non-transitory computer readable medium of claim 9, wherein the filesystem key is a secured hash algorithm key for a secured layer of the filesystem comprising a plurality of secured layers.

16. The non-transitory computer readable medium of claim 9, the instructions further comprising functionality for:
    obtaining vulnerability information regarding a second software image, wherein the vulnerability information describes a second software vulnerability; and
    identifying, using the vulnerability map, a second hardware network element that has the second software vulnerability.

17. A method for managing network vulnerabilities, comprising:
    obtaining, at a hardware network element and from a network controller disposed on a network, a callback comprising executable code configured to cause the hardware network element to transmit a filesystem manifest to the network controller;
    executing, on the hardware network element, the callback; and
    transmitting, in response to executing the callback and to the network controller, image data from the filesystem manifest,
    wherein the image data identifies a filesystem key in the filesystem manifest that corresponds to a software container among a plurality of software containers, the plurality of software containers being virtualized user-space instances operating on a single kernel in the hardware network element, and
    wherein the image data is configured to cause the network controller to generate a vulnerability map of the network.

18. The method of claim 17, wherein the callback is a webhook.

19. The method of claim 17, further comprising:
    obtaining, at the hardware network element, a notification from the network controller regarding a threat associated with a software vulnerability that is determined by the network controller using the vulnerability map,
    wherein the hardware network element implements a solution to the threat.

20. The method of claim 17, wherein the filesystem key is a secured hash algorithm key for a secured layer of the filesystem comprising a plurality of secured layers.

* * * * *